July 1, 1924.

A. STECKELMACHER

ARTIFICIAL TOOTH

Filed Dec. 6, 1921

1,499,417

INVENTOR
ADOLF STECKELMACHER
by Ralph Kalish  ATTORNEY.

Patented July 1, 1924.

1,499,417

UNITED STATES PATENT OFFICE.

ADOLF STECKELMACHER, OF EPPINGEN, GERMANY.

ARTIFICIAL TOOTH.

Application filed December 6, 1921. Serial No. 520,292.

*To all whom it may concern:*

Be it known that I, ADOLF STECKELMACHER, a citizen of Germany, residing at Eppingen, Baden, Germany, have invented a certain new and useful Improvement in Artificial Teeth, of which the following is a specification, reference being had to accompanying drawing, forming a part thereof.

This invention relates to a certain new and useful improvement in artificial teeth.

The manufacture or production of artificial teeth today, so far as I am aware, is more or less laborious and costly and involves generally the employment or use either of securing-pegs, usually of platinum or its substitutes, or of so-called dovetail keys. I may add that in the production of teeth in which securing-pegs are present, briefly the pegs are first burnt into the tooth. The several teeth are then fixed into a metallic protective back-plate by a soldering of the pegs to the plate, and the back-plate, in turn, fastened or soldered in a suitable manner to the gum-plate. Incident to such manufacture, however, is a frequent breaking or cracking of the teeth under the heat to which the tooth is subjected in the soldering of the pegs to the plates, much loss both in time and money and inconvenience resulting.

In the production of teeth in which dovetail keys are present, briefly the tooth is first formed longitudinally, or up and down, with a groove. The back-plate is formed with a corresponding ridge or tail of dimensions to tightly fit the tooth-groove. The tooth is then pressed upon the plate and tightly engaged at its groove with the so-called tail of the plate. Incident to this production of the teeth, however, and following the grooving of the tooth, is a considerable weakening and reduction in the power of resistance of the tooth, with the result that cracking or breaking of the teeth is also a frequent occurence, and it may be stated further that cracking or breaking of the teeth also often occurs on account of changes in temperature, causing either contraction or expansion, to which the metallic back-plate and the teeth are subjected in their manufacture.

It is, therefore, the principal object of my present invention to provide an artificial tooth in which the objectionable and disadvantageous features of present artificial teeth are obviated and, to that end, to provide an artificial tooth which is of strong, durable, and efficient construction, and which may be economically and conveniently manufactured and in the manufacture of which the grooving and consequent weakening of the tooth, as well as the use of platinum pegs, which are more or less expensive and often unobtainable, and the consequent burning or fusing of the pegs in the teeth or to the plates, are eliminated.

With the above and other objects in view, my present invention resides in the provision of an artificial tooth which includes a socket, dowel-equipped back-plate adapted for attachment to the gum-plate, and a tooth proper shaped to fit snugly in the socket of the back-plate and having a seat for the dowel, and to which plate and dowel the tooth is rigidly fixed by cement or other adhesive, the socket-connection between the tooth and plate relieving the dowel from stresses incident to the bringing of the teeth together in mastication of food, and in the novel features of form, construction, arrangement, and combination of the several parts of the tooth as hereinafter fully described and afterwards pointed out in the claims.

In the accompanying drawing,—

Figure 1:
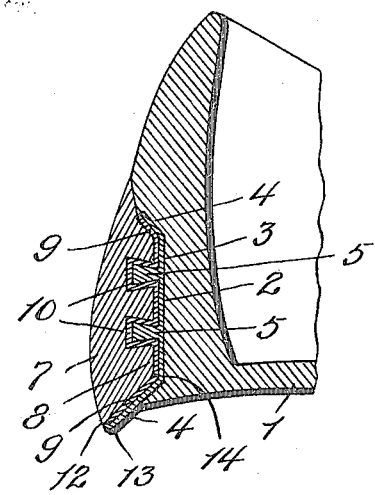
Figure 1 shows in vertical or longitudinal section an artificial tooth (central incisor) connected or fixed to a fragment of a gum-plate in accordance with and embodying my invention.

Referring now more in detail to the said drawing, which illustrates a practical embodiment of my invention and in which like reference characters refer to like parts throughout the several views, 1 designates the gum-plate, which is preferably constructed of caoutchouc and which is variable as to contour and dimensions to meet the requirements of any particular dental adaption.

Figure 2:
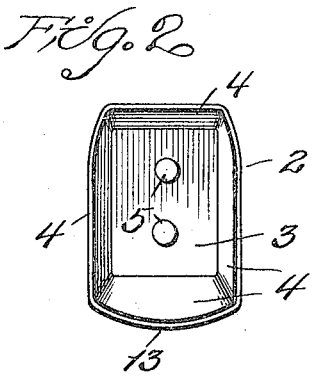
Figure 2 is a front elevational view of the back-plate to which the tooth proper is directly secured.
Figure 3:
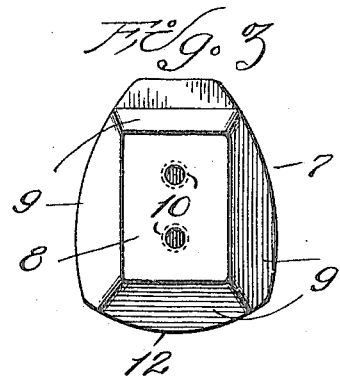
Figure 3 is a rear elevational view of the tooth proper or facet.
Figure 4:
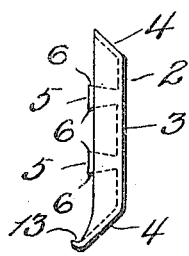
Figure 4 is an edge view of the back-plate shown in Figure 2.

2 designates a so-called back-plate, which is of suitable preferably metallic material and of socket or chambered form, as best seen in Figure 2, the plate 2 comprising a body-portion or back-wall or plate proper 3 preferably flat and substantially continuous marginal side, top and bottom walls 4 which obliquely project or flare forwardly and outwardly from the back-plate 3. Integral with or otherwise fixed to, and also projecting forwardly from, back-plate 3, is one or more pins or dowels 5 preferably of frustum-shape with their base presently forwardly or distant from the surface or plane of plate 3, so that there are presented for attachment to the tooth surfaces, such as 6, divergent outwardly from the plate 3.

Figure 5:
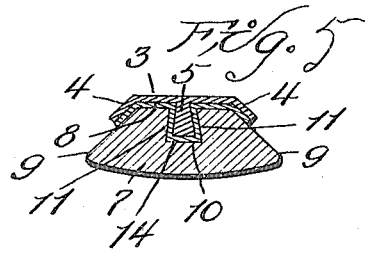
Figure 5 is a transverse sectional view of the attached or fixed back-plate and tooth.

The tooth proper 7 is composed of suitable material and is correspondingly shaped to snugly fit at its rear or posterior portion within the socket-plate 2, the rear face of the tooth comprising a central flat surface 8 conforming in contour with back-plate proper 3 and marginal bevels 9 conforming in contour with the flaring marginal walls 4 of the plate 2; and formed in the tooth 7 and open to its rear flat surface 8 are one or more cavities or seats 10 corresponding in number and for co-operation with the fixed pins or dowels 5. The seats 10 relatively to dowels 5 are of dimensions to freely accommodate the dowels 5 when the tooth 7 is fitted into the socket-plate 2 and, to that end, the seats 10 also conform in shape with, but are of somewhat greater dimensions than, the dowels, the side wall of each seat 10 including inwardly divergent surfaces 11 adapted to parallel the surfaces 6 of the dowels 5, as best seen in Figures 1 and 5.

As best seen in Figure 1, the lower marginal wall 4 of the socket-plate 2 is preferably extended forwardly to accommodate the lower or biting edge 12 of the tooth and, by further preference, is provided at such edge with a lip 13 adapted to fit and serve as a protecting-seat for the edge 12 of the tooth when the socket-plate 2 and tooth 7 are assembled, whereby the tooth 7 is largely relieved of stresses incident to mastication and strains upon the connecting-dowels 5 between the tooth 7 and its supporting-socket 2 greatly reduced.

In the production of the tooth, the gum-plate 1 is suitably formed or molded as is common to fit a certain mouth. The plate or plates 2, suitably formed and shaped to accommodate the tooth or teeth to fit the particular mouth, are then secured or fixed in proper position to and upon the gum-plate 1 by means such, for instance, as high-fusion gold solder. Cement or other suitable adhesive is then lined, as at 14, upon the posterior face of the tooth 7 and in and about the dowel-recesses or seats 10, and the tooth then pressed into the socket-plate 2 with the dowels 5 fitting in the seats 10. The cement 14 is then permitted to harden, when the set of teeth is finished and ready for use.

In my new tooth, as will be noted, there is primarily substantially a "finished" gum-plate comprising dowels and a finished "tooth" comprising dowel-seats, and the "finished tooth" is fixed securely to the finished gum-plate by the medium of an adhesive, such as cement which "keys" the dowels in the tooth, the tooth or teeth being conveniently, strongly, and efficiently fixed in position and fusing or burning of pegs in the teeth, to the frequent damage of the teeth, and grooving or other structural weakening of the teeth entirely eliminated. Secondarily, there is a back-plate which is secured to the gum-plate and which is provided with outstanding flaring walls which embrace the tooth and thereby tend to relieve strains on the dowels during mastication. And, thirdly, there is a metallic protector for the point of biting or chewing edge of the tooth, which directly receives the stresses incident to mastication and transmits them to the tooth supporting elements rather than to the tooth securing elements, as is common where the tooth directly receives such stresses and delivers them to their connecting elements with the gum-plate.

I may add that the entire set of teeth may be inexpensively and economically completed before the teeth proper 7 are placed in their respective positions, injury or damage of the teeth while the set is being finished being thereby avoided.

I am aware that changes in the form, construction, arrangement, and combination of the several parts of the tooth or teeth may be made and substituted for those herein shown and described without departing from the nature and principle of my invention.

Having thus described my invention, what I claim and desire to secure by Letters Patent is:

1. An artificial tooth including a chambered mounting comprising a back wall and top, side, and bottom walls extending continuously around and each projecting obliquely forwardly and outwardly from the margin of, the back wall, in combination with a tooth marginally beveled upon its posterior portion and fitting at said posterior portion snugly within the mounting, the tooth having a cavity opening upon its rear face, and means including a dowel fixed upon and projecting forwardly from the back wall of the mounting and into the cavity of the tooth for rigidly fastening the tooth to the mounting.

2. An artificial tooth including a chambered mounting comprising a back wall and top, side, and bottom walls extending continuously around and each projecting obliquely forwardly and outwardly from the margin of, the back wall, in combination with a tooth marginally beveled upon its posterior portion and fitting at said posterior portion snugly within the mounting, the tooth having a cavity opening upon its rear face, means including a dowel fixed upon and projecting forwardly from the back wall of the mounting and into the cavity of the tooth for rigidly fastening the tooth to the mounting, and a lip extending upwardly and forwardly from the lower edge of the bottom marginal wall and snugly engaging and providing a protective seat for the lower biting edge of the tooth.

In testimony whereof, I have signed my name to this specification.

ADOLF STECKELMACHER.